Dec. 26, 1922.
E. E. ENGLUND.
PLANTER.
FILED OCT. 19, 1921.
1,439,877.
2 SHEETS—SHEET 1.
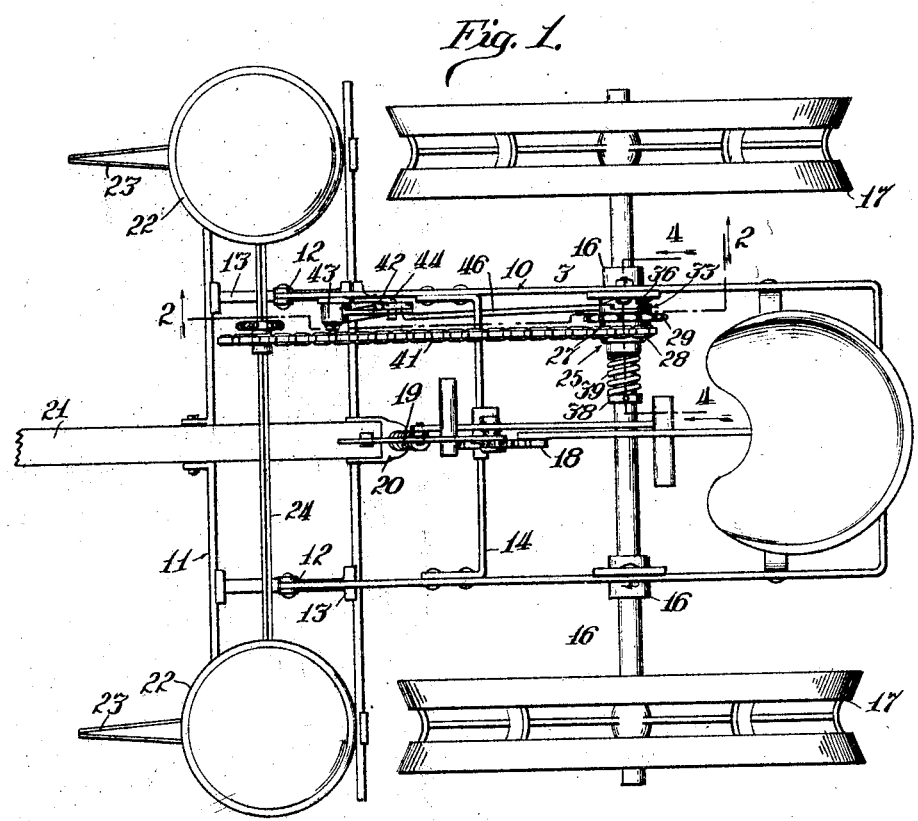
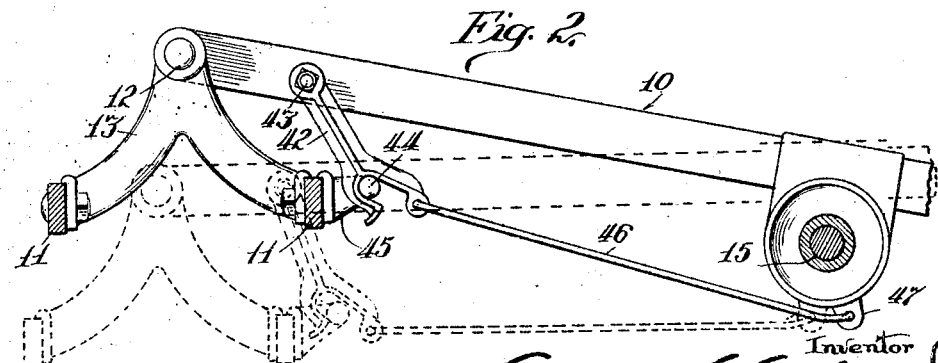

Dec. 26, 1922.
E. E. ENGLUND.
PLANTER.
FILED OCT. 19, 1921.
1,439,877.
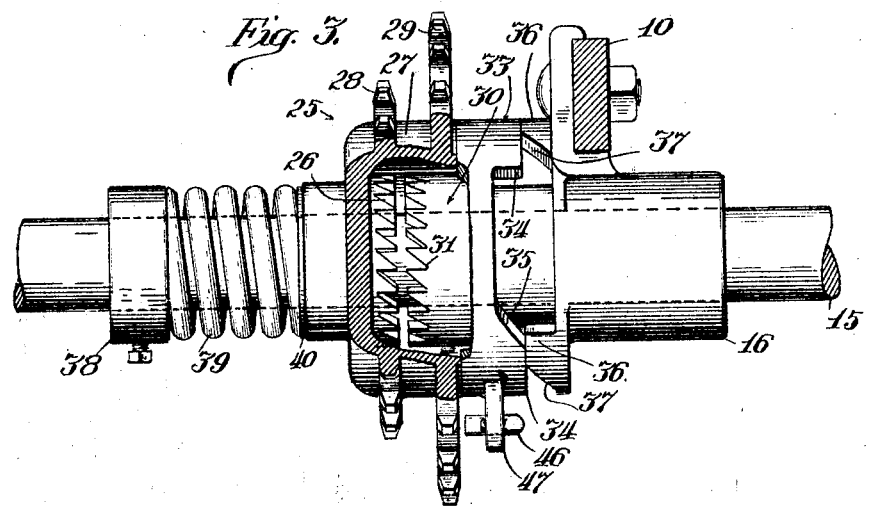
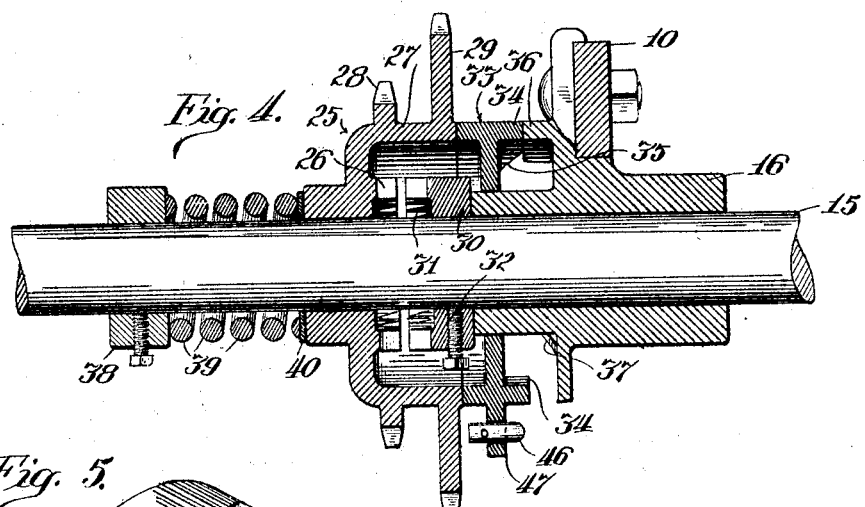
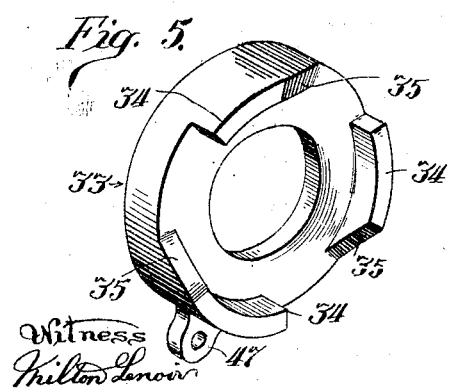

Patented Dec. 26, 1922.

1,439,877

UNITED STATES PATENT OFFICE.

ERNST E. ENGLUND, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

PLANTER.

Application filed October 19, 1921. Serial No. 508,649.

*To all whom it may concern:*

Be it known that I, ERNST E. ENGLUND, a citizen of the United States, and a resident of Moline, in the county of Rock Island and State of Illinois, have invented certain new and useful Improvements in Planters, of which the following is a specification, reference being had to the accompanying drawings.

This invention relates to planting machines of the well-known type comprising a rear or main wheeled frame and a front or runner frame hinged together and having the rotating shaft that is carried by the said front frame driven by a sprocket chain running over sprockets on the said shaft and the axle of the machine. It is old in connection with such structures to provide clutch means for automatically effecting a stoppage of the seed plates when the planter runners are raised to inoperative position, but the driving sprockets and chain still continue running. It is the object of my invention to so improve machines of the general type referred to that when the front or runner frame is raised to inoperative position, as, for example, when turning at the ends of rows or driving to and from a field, the driving sprockets and chain will be automatically stopped, and, when such front frame is again lowered into operative position such sprocket driving members will in like manner be again set in operation. Briefly stated, I accomplish this object by providing upon the main axle of the planter a clutch member that is fast on such axle and adapted to engage with or be disengaged from a second clutch member that carries the driving sprocket on such axle, and, through clutch-shifting means that includes a cam on the axle and a forwardly-extending rod from such cam to the front frame of the planter, causing the said driving sprocket to be clutched to or disengaged from the axle accordingly as the front or runner frame is lowered into operative position or raised to inoperative position. In the claims I have pointed out what I believe to be novel.

In the drawings,—

Fig. 1 is a top or plan view of an ordinary corn-planter in which my invention is embodied;

Fig. 2 is an enlarged detail, being substantially a section taken at line 2—2 of Fig. 1, and showing in dotted lines the position of the parts when the frames are in operative position;

Fig. 3 is a view in rear elevation of the clutch means carried by the axle of the planter, the clutch members being shown separated from each other, and a part of the sprocket-carrying member being broken away;

Fig. 4 is a vertical section through the same parts that are shown in Fig. 3 and in the same relative positions, the section being taken on the line 4—4 of Fig. 1; and Fig. 5 is a perspective view of the cam on the axle, through a turning of which the clutch is operated.

Referring to the several figures of the drawings: The rear frame of the planter is indicated by 10, and the front frame thereof by 11. These frames are of usual construction, and are pivotally connected together as usual, the connection in the construction shown being by jointing the side bars of the rear frame at 12 to brackets 13 that are bolted to and rise from the two main bars of the front frame. Extending between the side bars of the rear frame and acting as a brace is the usual bar 14, that is bolted to such side bars. The usual axle that extends across and is secured to the rear frame is indicated by 15, the journals in which it is rotatably mounted being indicated by 16, and the usual covering and supporting wheels mounted on the ends of the axle being indicated by 17. Pivotally mounted on the rear frame is an ordinary adjusting lever, provided with the usual spring latch for engaging with a sector 18. Such lever is connected at its forward end with the usual link that at its lower end is connected with the front frame or some part rigidly affixed thereto, whereby upon a manipulation of the lever the front frame may be raised or lowered, as required, to carry it out of or into operative position. The link that connects such lever with the front frame will ordinarily be surrounded by a coiled spring as usual, said spring being shown in Fig. 1 and indicated by 19. As shown, the connection of the lever mechanism to the front frame is made through a heavy bracket 20 bolted to the rear bar of such front frame, which bracket also furnishes a means to which the usual draft tongue 21 may be bolted. The front frame carries the usual seed boxes 22 and furrow openers 23, and, as is well understood, the seed dispensing mechanism in the bottoms of the boxes will be operated through the rotation of a shaft 24—such shaft being driven by suitable means from the axle 15. The structure so far referred to may be of any ordinary design, and therefore needs no further specific description.

Loosely mounted upon the axle 15 is a clutch member 25, provided on its inner face with ordinary clutch teeth 26, and having a wide circumferential flange 27 that carries, in the construction shown, two sprockets 28 and 29 of different sizes. Upon the shaft 15 is secured, so as to turn therewith, a second clutch member 30 having teeth opposite the teeth 26 of the other member, and adapted to interlock therewith when the clutch member 25 is to be driven with the axle. In the construction shown the clutch member 30 is made fast to the axle by a bolt 32 as shown. Rotatably mounted upon the cylindrical surface of one end of the adjacent bearing 16 is a collar-shaped cam 33 which, as shown, has a circumferential flange that extends in both directions from the central web of the member. One edge of such flange is smooth or unbroken, and bears at all times against the edge of the flange 27 of the larger clutch member 25. The opposite edge of the flange of the member 33 is cut away at regular intervals, as clearly shown in Fig. 5, to form a plurality of lugs 34, each of which has a portion of its edge inclined to form cam surfaces 35. The straight portions of the edges of the lugs 34 are adapted in one position of the member 33 to bear against like edges of lugs 36 that project from and are preferably formed integrally with the adjacent bearing 16. These last named lugs 36 also have cam-shaped or inclined surfaces 37, with which the similarly inclined surfaces 35 of the member 33 are adapted to bear against when the annular or sleeve-like member 33 has been rotated as hereinafter described. Secured upon the axle 15 at some little distance from the clutch member 25 is secured in any usual manner a collar 38 that forms a fixed abutment for one end of a comparatively heavy coiled spring that at its other end bears against the end of the clutch member 25 or, preferably, against a washer 40, as shown, which spring of course, as will be understood, tends to force the clutch member 25 that is loose on the axle toward the other clutch member 30 that is fixed on such axle. It will be appreciated that with the annular cam member 33 in the position shown in Figs. 3 and 4, the two clutch members are held out of engagement, but with such member 33 rotated sufficiently to bring its inclined or cam faces 35 opposite the complementary faces 37 the spring will be permitted to force the two clutch members into engagement so as to compel the clutch member 25 to rotate with the axle. The seeding shaft is adapted to be driven from the axle as usual by means of a sprocket chain 41, which will pass over either one of the sprockets 28 and 29 before referred to, and over one of the other sprockets on such shaft, as shown, the chain being engaged over either set of sprockets according to the speed of rotation at which it is desired to drive the shaft, as will be understood.

When the front frame of a planter of this type is raised into inoperative position, the rear frame will rock to some extent on the wheel axle with the result that the front end thereof will stand in a raised position approximately as shown in Fig. 2, and when the front frame is lowered the front part of the rear frame will also move down, as indicated by the dotted lines in Fig. 2, such movement of the rear frame as well as the front frame being compelled, as will be understood, by reason of the attachment of the front end of the tongue to the draft animals. Such rising and falling movements of course carry the pivoted front frame and the forward end of the rear frame slightly backward or forward, as Fig. 2 indicates, and I take advantage of such combined up and down and forward and back movement of these parts to compel a turning of the annular cam member for effecting an interlocking or disengaging of the two clutch members 25 and 30. The means employed for this purpose comprise an arm 42 pivotally attached at 43 to the adjacent side bar of the rear frame 10, at a point a little in the rear of the pivoting of such side bar at 12 to the front frame bracket 13. This arm 42 is, as shown, extended slightly to the rear at its lower end, and at such lower end bifurcated to adapt it to receive therein a stud 44, carried by and preferably formed with a bracket 45 that is bolted to the rear bar of the front frame 11. To the lower and rearwardly extending end of the arm 42 is loosely attached a link 46 which extends rearwardly, and at its rear end is connected to an ear 47 on the surface of the annular cam member 33. The link is preferably connected both with the arm 42 and the ear 47 by having its ends turned to pass loosely through holes in such two parts, such turned ends being held therein in any usual way. From the foregoing it will be seen that when the frames are forced down into operative position, as indicated by the dotted lines in Fig. 2, the slight forward movement that the front frame necessarily has is sufficient to cause a pull on the link 46 that will rotate the cam member 33 sufficiently to cause its inclined or cam surfaces 35 to ride down upon the corresponding inclined surfaces 37 of the fixed part 36, and as that takes place, the clutch member 25 will be forced by the spring 39 into clutching engagement with the fixed clutch member 30, and thereupon such clutch member will of course rotate with the axle, and cause a driving of the shaft 24 for drilling purposes. A raising of the parts to the position shown in full lines in Fig. 2 will of course result in a reverse movement of the member 33 that will carry the straight edges of its lugs into contact with the straight edges of the fixed parts 36, and of course force back the clutch member 25 to the position shown in Figs. 3 and 4, and with the parts in that position the driving of the shaft 24 is of course stopped. By having the lower end of the arm bifurcated and having such bifurcated end turned a little to the rear, as shown, the front frame may have a certain amount of independent movement as it moves over the rough ground, without such movement sufficiently affecting the arm 42 and link 46 as to cause a turning of the cam member 33 that would allow the clutch members to be disengaged from each other.

While planters have been provided with automatic clutch mechanism on the hopper seed shaft which will stop the seed plates from turning when the planter's front frame is lifted to inoperative position, such constructions have still permitted continuous running of the sprockets and the sprocket chain so long as the machine was moving. My invention, however, is radically different from such devices, in that the entire driving mechanism is silenced or stopped, which is an advantage from several standpoints, and particularly that it saves wear and tear by the elimination of the necessity for continuing in motion parts that are then not contributing to the working of the apparatus.

What I claim as my invention and desire to secure by Letters Patent, is—

1. The combination in a planter comprising a rear frame in which is journaled a rotatable axle and a front frame in which is journaled a rotatable shaft, and means for driving said shaft from said axle, of means for raising and lowering said front frame out of and into operative position, a clutch element slidingly mounted on said axle, a cam device adapted by its movement to permit said clutch element to move into or out of clutching engagement with the axle, a link connected with and extending forwardly from said cam device, a depending arm pivotally connected with said rear frame and also with the forward end of said link, and a rearwardly-projecting member carried by the front frame with which member said arm is loosely connected.

2. The combination in a planter comprising a rear frame in which is journaled a rotatable axle and a front frame in which is journaled a rotatable shaft, a clutch on said axle comprising a member fast on the axle and a member loose on the axle, a sprocket on said loose clutch member, another sprocket on said shaft, a chain passing over said sprockets, a cam device on the axle adapted to permit an engagement of said clutch members with each other or cause their disengagement, a link connected with said cam device and extending forwardly therefrom, and a pivoted arm depending from the rear frame and movably engaged at its lower portion with the front frame, to which arm said link is connected.

3. The combination in a planter comprising a rear frame in which is journaled a rotatable axle and a front frame in which is journaled a rotatable shaft, a clutch on said axle comprising a member fast on the axle and a member loose on the axle, a sprocket on said loose clutch member, another sprocket on said shaft, a chain passing over said sprockets, a cam device on the axle adapted to permit an engagement of said clutch members with each other or cause their disengagement, a link connected with said cam device and extending forwardly therefrom, a pivoted arm depending from the rear frame and provided in its lower portion with a slot, and a fixed stud on the front frame projecting into said slot, to which pivoted arm said link is connected.

4. The combination in a planter comprising a rear frame in which is journaled a rotatable axle and a front frame in which is journaled a rotatable shaft, a clutch on said axle comprising a member fast on the axle and a member loose on the axle, a sprocket on said loose clutch member, another sprocket on said shaft, a chain passing over said sprockets, a cam device on the axle adapted to permit an engagement of said clutch members with each other or cause their disengagement, a link connected with said cam device and extending forwardly therefrom, a pivoted arm depending from the rear frame and provided in its lower portion with a rearwardly-extending slot, and a stud fixed on the front frame and projecting into said slot, to which pivoted arm said link is connected.

ERNST E. ENGLUND.